United States Patent [19]

Mitschke et al.

[11] Patent Number: 4,730,105

[45] Date of Patent: Mar. 8, 1988

[54] APPARATUS FOR THE STABILIZATION OF THE OUTPUT INTENSITY OF A LASER USING A FABRY-PEROT CAVITY

[75] Inventors: Fedor M. Mitschke, Red Bank; Linn F. Mollenauer, Colts Neck, both of N.J.

[73] Assignee: American Telephone and Telegraph Company, AT&T Bell Laboratories, Murray Hill, N.J.

[21] Appl. No.: 889,252

[22] Filed: Jul. 25, 1986

[51] Int. Cl.$^4$ ............................................. G01J 1/32
[52] U.S. Cl. ....................................... 250/205; 372/31
[58] Field of Search ........................... 372/31, 92, 29; 250/201 R, 205

[56] References Cited

U.S. PATENT DOCUMENTS

| | | | |
|---|---|---|---|
| 3,484,719 | 12/1969 | Smith | 331/94.5 |
| 3,747,019 | 7/1973 | Koechner et al. | 372/31 |
| 3,780,296 | 12/1973 | Waksberg et al. | 372/31 |
| 4,072,858 | 2/1978 | Stone | 250/205 |
| 4,092,530 | 5/1978 | Wise | 250/205 |
| 4,556,979 | 12/1985 | Scott et al. | 372/92 |
| 4,580,044 | 4/1986 | Hongo et al. | 250/205 |
| 4,583,227 | 4/1986 | Kirkby | 372/92 |

OTHER PUBLICATIONS

Kobayashi et al., "Single-Frequency Oscillation Using . . .", Appl. Phys. Let., vol. 16, No. 5, Mar. 1, 1970, pp. 217-218.

Primary Examiner—David C. Nelms
Assistant Examiner—Chung Seo
Attorney, Agent, or Firm—Daniel D. Dubosky; Gregory C. Ranieri

[57] ABSTRACT

An external mirror is positioned relative to the output mirror of a laser to form a Fabry-Perot cavity. The light transmitted by this Fabry-Perot cavity is compared to a reference value in order to develop an error signal which in turn is used to adjust the transmission characteristics of the Fabry-Perot cavity. In the embodiment constructed a beam splitter is positioned to deflect light coupled out of the Fabry-Perot cavity to an optical detector. The output of this detector is compared to a reference voltage in a difference amplifier which generates an electrical error signal. The electrical error signal is coupled to a piezoelectric translator which is attached to the external mirror and is capable of moving that mirror in a way so as to change the transmission characteristics of the Fabry-Perot cavity. Specific embodiments using a dye laser and a soliton laser are also disclosed.

3 Claims, 7 Drawing Figures

APPARATUS FOR THE STABILIZATION OF THE OUTPUT INTENSITY OF A LASER USING A FABRY-PEROT CAVITY

BACKGROUND OF THE INVENTION

In many applications of laser light, it is essential that the light intensity delivered by the laser be as constant as possible. A certain fluctuation of the intensity around its mean value is, however, unavoidable. One reason is that the energy supply rate from the pump source is never completely steady. There is a noise contribution which the laser not only transfers to its output intensity, but rather tends to exaggerate, especially if it is operated not too far above its threshold. On the other hand, there are sources for fluctuations of the output intensity that are located inside the laser itself. The most common of these internal noise sources is a small vibration of the optical components (e.g. mirrors), such as are caused by acoustic waves in the environment. Some types of lasers have additional sources for fluctuations; dye jet lasers, for example, are easily perturbed by small fluctuations in the flow of the jet.

All these noise contributions can be kept within limits by a proper construction. It is common practice to use regulated power supplies and set up lasers on vibration-damping tables. Nevertheless, a typical laser still has a fluctuation of its output intensity of the order of a few percent. For many applications, this is far too much, and in these cases active stabilization is required.

Active stabilization makes use of a measurement of the output intensity by steering a small portion of the output beam to a detector. The AC component of the detector signal represents the fluctuation that has to be removed and can thus serve as the error signal. All known schemes for active stabilization proceed according to one of the two following schemes: (1) the error signal is fed back to the energy source of the laser, which may be an electric power supply unit, and feedback is arranged in such a way that the error signal is reduced, that is, so the output intensity is stabilized; (2) the error signal controls a variable light attenuator, which may be an electro-optic modulator placed between the laser output and the place where the output intensity sample is taken, and feedback is arranged so as to give the desired effect of reducing the fluctuation.

Both prior art schemes, however, have severe disadvantages. The first scheme may not be applicable at all if there is no way of controlling the power supply. Even if the supply can be reasonably controlled, very often this control can act only very slowly so that only a small bandwidth of the noise is affected. The second scheme avoids these difficulties, but trades them in for others. In order to be effective, the variable attenuator typically attenuates the transmitted beam by 30 to 50 percent. This means that a substantial amount of the total power has to be sacrificed. It is often difficult to produce just enough laser power for a given purpose, and such a sacrifice is then unacceptable.

SUMMARY OF THE INVENTION

A fast-acting, low-loss apparatus for stabilizing the output intensity of a laser is provided in accordance with the present invention wherein a mirror is positioned relative to the output mirror of a laser so as to form a Fabry-Perot cavity. The light coupled out of this Fabry-Perot cavity is sampled and compared with a reference value so as to generate an error signal. This error signal is used to adjust the transmission characteristics of the Fabry-Perot cavity.

In the embodiment constructed, a beam splitter is placed in the path of the output light and the deflected light is coupled to an optical detector which generates a voltage whose value represents the output light intensity. This voltage is compared in a difference amplifier to a reference voltage. The error signal developed by the difference amplifier is coupled to a transducer which is connected to the added mirror in a way so as to translate this mirror relative to the output mirror of the laser thereby changing the transmission characteristics of the Fabry-Perot cavity.

DETAILED DESCRIPTION

Figure 1:
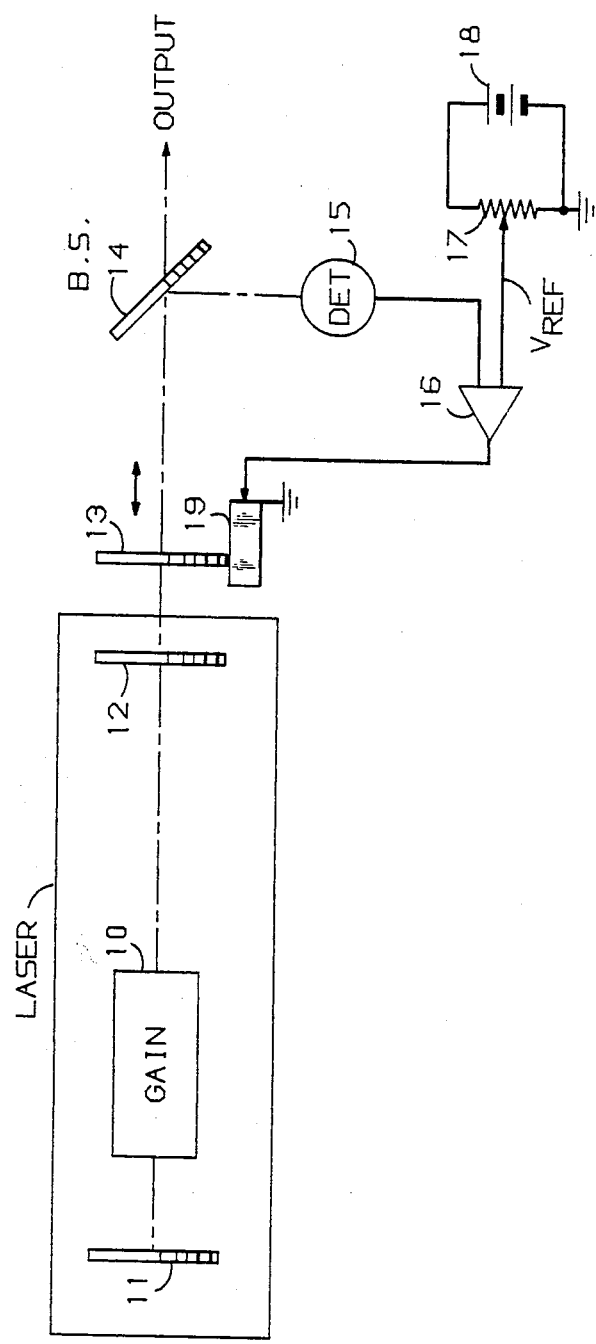
FIG. 1 is a laser apparatus constructed in accordance with the present invention.

The present invention is universally applicable because it does not rely on any particular properties of the laser system (like the use of a special type of energy supply). It acts directly on the output beam, or more precisely, on the way it is coupled out of the laser cavity. At the same time, it is a very simple technique, requiring only one additional optical component—a mirror—and a fairly straightforward electronic control circuit.

In order to describe the operation of the present invention it is appropriate to recall the principle of operation of a so-called plane Fabry-Perot resonator. The plane Fabry-Perot resonator consists of two mirrors aligned parallel to each other such that one single light ray can pass through both of them. The intensity reflection coefficients of the two mirrors, $R_1$ and $R_2$, are between zero and unity. Part of the transversing light ray is reflected at either mirror, and some part of the light experiences multiple reflection as it bounces back and forth between the two mirrors. Therefore, both the intensity transmitted through this array, $I_t$, and the intensity reflected from it, $I_r$, are a result of interference between many individual rays. The relationship of $I_t$ and $I_r$ to the irradiated intensity $I_i$ are as follows:

$$I_r = I_i \cdot \frac{\frac{R_1 + R_2 - 2R}{(1-R)^2} + F\sin^2(\sigma/2)}{1 + F\sin^2(\sigma/2)} \quad (1)$$

$$I_t = I_i \frac{(1-R_1)(1-R_2)}{(1-R)^2} \cdot \frac{1}{1 + F\sin^2(\sigma/2)} \quad (2)$$

where $$R = \sqrt{R_1 R_2}$$

$$F = \frac{4R}{(1-R)^2}$$

and

-continued $$\sigma = \frac{2\pi}{\lambda} d + \sigma_o \, d \, 1 \cdot n$$

Here, d is the optical path length between the two mirrors, 1 is the geometrical distance of the two mirrors, n is the (average) refractive index of the medium between the mirrors, $\lambda$ is the wavelength of the light, and $\sigma_o$ describes possible phase jumps in the mirrors.

The above equations (1) and (2) are known as the Airy formulas for the plane Fabry-Perot resonator and are given here for the case of negligible absorptive losses. It should be noted that the sum of the transmitted and the reflected intensities gives just the irradiated intensity, as is consistent with the principle of the conservation of energy:

$$I_t + I_r = I_i \quad (3)$$

A Fabry-Perot resonator is frequently characterized in terms of its free spectral range (FSR) and its finesse $\bar{F}$. The free spectral range describes the frequency separation of two adjacent cavity modes and is given by:

$$FSR = \frac{c}{2d} \quad (4)$$

where c is the speed of light in a vacuum. The finesse is a measure of the cavity Q factor and is defined as the free spectral range, divided by the width of a resonance peak (full width at half maximum of intensity). From equation (1) or equation (2), it follows that the finesse $\bar{F}$ is given by:

$$\bar{F} = \frac{\pi}{\arcsin \frac{1-R}{\sqrt{R}}} \quad (5)$$

For mirror reflectivities that are not too small, this reduces to the form $$\bar{F} = \frac{\pi \sqrt{R}}{1-R} = \frac{\pi}{2} \sqrt{F}$$

The essential idea of the invention consists of a replacement of the laser output mirror by a plane Fabry-Perot resonator in lasers with a standing wave resonator. The invention is also applicable to the case of a running wave laser resonator (a ring laser) as discussed hereinbelow. In FIG. 1, a laser with a standing wave resonator is shown with gain medium 10 positioned between mirror 11 and output mirror 12. To practice the invention, one plane mirror 13 is added in the path of the outgoing beam. The existing output mirror 12 thus forms a Fabry-Perot resonator with the additional mirror 13. The intensity of the wave transmitted through this Fabry-Perot resonator can be influenced by an adjustment of the optical path length between the two mirrors. This gives a means of stabilizing the output intensity. To stabilize the output, part of the output beam from the Fabry-Perot resonator is reflected from a beam splitter 14 to impinge on a detector 15. The electrical output from detector 15 is compared in a difference amplifier 16 to a reference voltage provided by potentiometer 17 and voltage source 18. The error signal developed by amplifier 16 is utilized to adjust the optical path length of the Fabry-Perot resonator such that the error signal is minimized. The error signal from difference amplified 16 is connected to a piezo-electric translator 19 which is capable of moving mirror 13 relative to mirror 12.

The difference between the present invention and the scheme described hereinabove that involves a variable attenuator lies in the fact that in the present invention better use is made of the energy available from the laser resonator. All the energy that is not coupled out is returned to the laser cavity, rather than being totally lost. This is so because the invention relies on dispersion rather than absorption and therefore has a lesser effect on the energy budget in the system.

Figure 2:
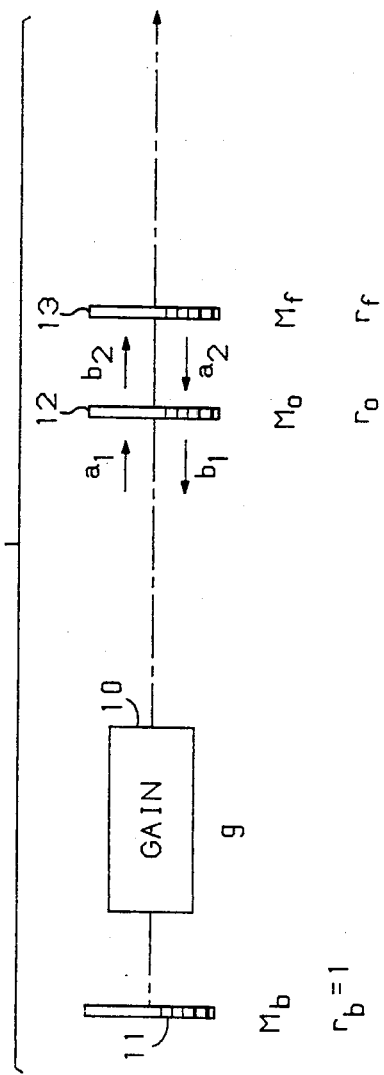
FIGS. 2, 3 and 4 are block diagrams and waveforms useful in describing the operation of the present invention.

Operation of the present invention can be better understood by treating the two coupled cavities as independent. A more complete representation of the situation is sketched in FIG. 2. As shown in FIG. 2, there are three mirrors forming two coupled cavities. One of these cavities, the laser or main cavity, contains a gain medium 10 having a gain g. Losses in either resonator can be lumped into the effective mirror reflectivities or the effective gain. We consider the amplitudes of the optical fields on either side of the central mirror 12, $M_0$. The fields moving away from mirror 12, $b_1$ and $b_2$, are related to the fields impinging on mirror 12, $a_1$ and $a_2$, by the matrix equation $$b = Sa \quad (6)$$

where $$S = \begin{vmatrix} -r_0 & it_0 \\ it_0 & -r_0 \end{vmatrix},$$

$r_0$ is the amplitude reflectivity of mirror 12, and $t_0$ is the transmissivity of mirror 12. This equation, together with the conditions $$a_1 = b_1 g e^{i\phi_1}$$

$$a_2 = b_2 g e^{i\phi_2}$$

yields, after a straightforward calculation, the results $$|b_2|^2 = \frac{|b_1|^2 t_0^2 g^2}{1 + (r_0 r_f)^2 + 2 r_0 r_f \cos \phi_2} \quad (7)$$

and $$r_0 g \, e^{i\phi_0} = 1 - \frac{t_0^2 r_f g \, e^{i(\phi_0 + \phi_2)}}{1 + r_0 r_f e^{i\phi_2}} \quad (8)$$

The complete round trip phase in the laser cavity $\phi_0$ includes $\phi_1$ and the phase jump upon reflection at mirror 12:

$$\phi_0 = \phi_1 - \pi$$

Equation (7) reveals the possibility of stabilizing the output intensity by adjusting the cavity path length. In order to see this, we may think of the fluctuations as acting on the effective gain g (or $|b_1|^2$ which amounts to the same). But if g fluctuates, $|b_2|$ can be held constant by simply adjusting $\phi_2$ properly. We will see in greater detail how this works out from an examination of equation (8).

In the limiting case where the reflectivity of mirror 13 equals zero, i.e., $r_f = 0$, equation (8) yields the familiar condition for laser operation that the gain times loss must be unity:

$$r_0 g e^{i\phi_0} = 1$$

Figure 3:
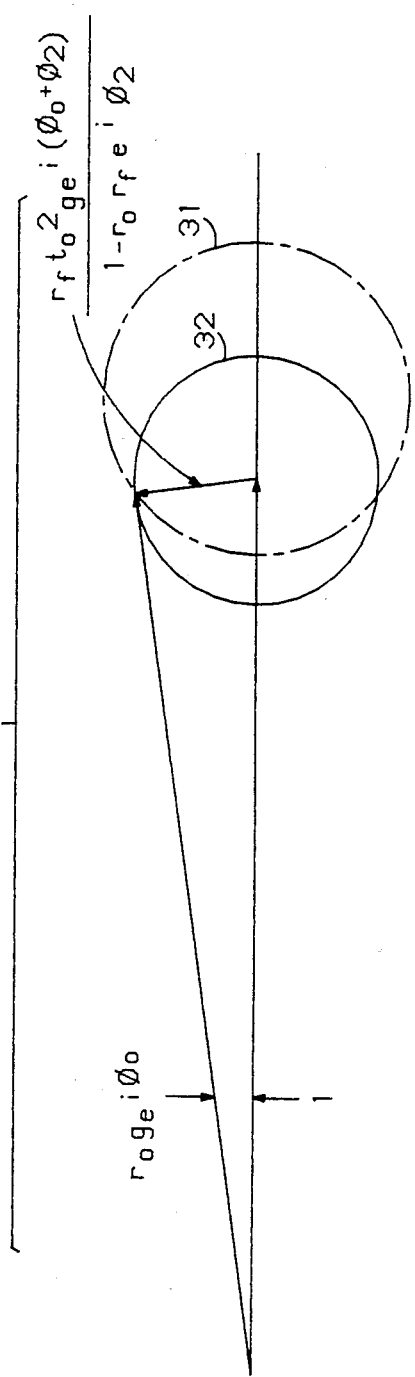

In accordance with the present invention, $r_f \neq 0$. Therefore, the lasing condition will be modified. Depending on the values of the phases $\phi_0$ and $\phi_2$, either more or less gain is required. This modification is best represented in graphic form as shown in FIG. 3. This vector diagram illustrates how the three terms in equation (8) relate to each other.

The existence of a stable lasing operation, which is implied by equation (8), is here represented by three vectors forming a closed triangle. If each of the three vectors are multiplied by the quantity $b_1$, the small vector at the right then stands for the field $a_2$; its length is therefore proportional to the output intensity $|b_2|^2$, because $|a_2|^2$ is proportional to $|b_2|^2$. If there were no active stabilization (no servo loop), fluctuations in g would make the corner of the triangle move on the dashed circle 31. That implies that the output intensity would contain the same relative amount of fluctuations as the quantity g alone (note that the dashed circle is off-center). This is, of course, an expected result.

The servo loop contains a detector that in effect measures the length of the small vector, plus a means of adjusting $\phi_2$ such that this length is kept constant. This means that, with the servo loop in action, the corner of the triangle moves on a circle that is centered around the right corner, that is on the solid circle 32. Now one can read from this figure how a fluctuation in g is accommodated by an adjustment in $\phi_2$ and a corresponding slight shift in $\phi_1$. It is also clear from this diagram that there is a finite range of gain values over which the closure of the triangle can be maintained and the intensity stabilized.

Figure 4:
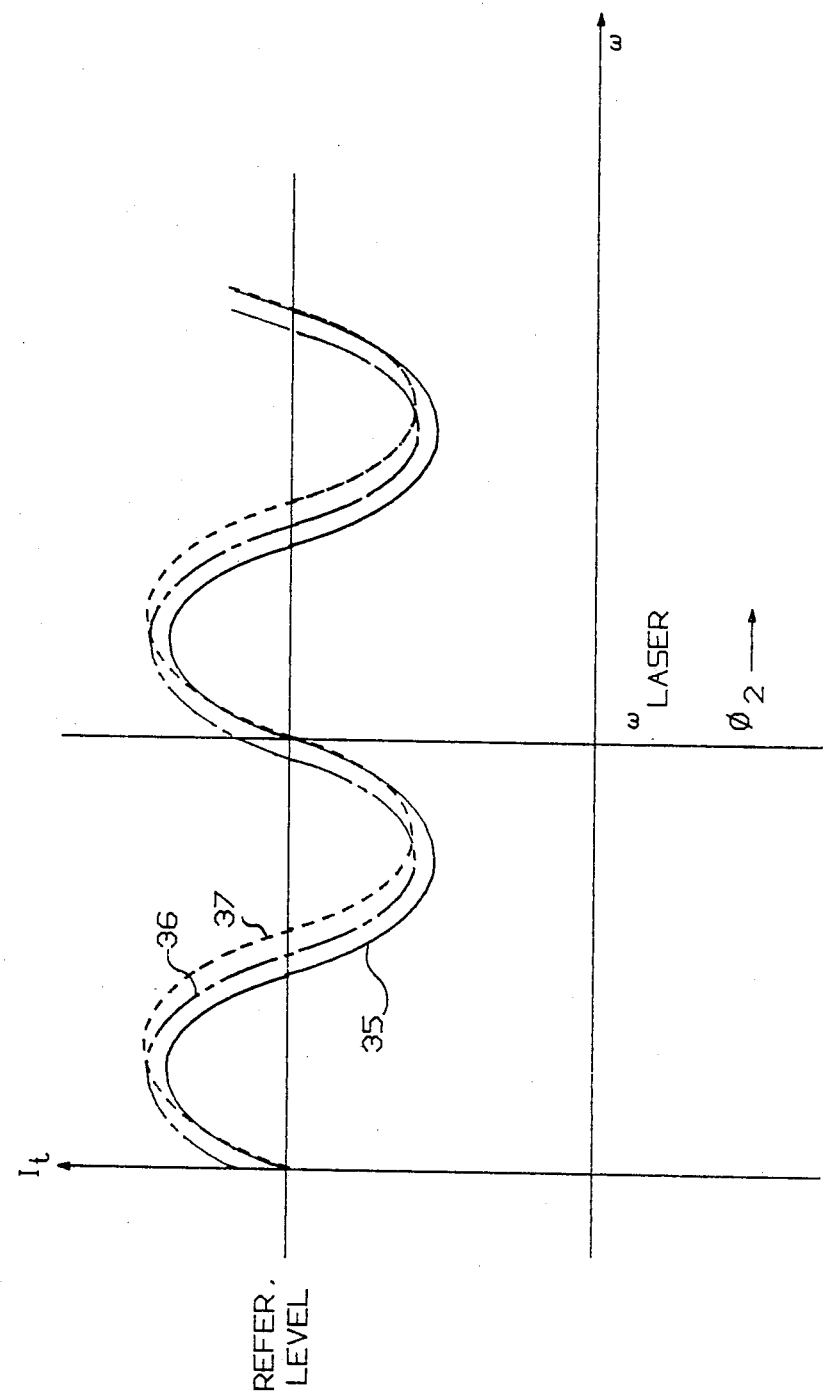

The same result can be seen from a different way of looking at it. Curve 35 in FIG. 4 shows the transmission of the additional resonator as a function of the optical frequency w for the case of a very low finesse (a reason for this choice is given below). If for some reason the gain suddenly increased, the whole curve would move upward as indicated by the dashed curve 36. But then, the intensity at the detector also increases, and the servo loop translates that into a corresponding shift to the side as indicated by the dotted curve 37. The relative width of the range over which regulation is possible is seen to be given simply by the contrast of the additional Fabry-Perot resonator.

For designing an actual system following this idea there are three questions to be answered: (a). What shall be the finesse of the additional Fabry-Perot resonator; (b). What shall be its free spectral range; and (c). By which means shall the control of the optical path length be accomplished?

In most applications of Fabry-Perot resonators, a high finesse is asked for in order to give a high frequency resolution. However, we are not concerned with frequency resolution here. Our purpose is to provide sufficient contrast between the maximum and minimum transmitted intensity so that there is enough amplitude range for the regulation of the laser intensity. With equations (2) and (5), one finds that even a finesse as low as of the order of unity gives sufficient contrast. There is no reason to make the finesse much higher than this; in fact, if the finesse is too high, the additional resonator itself becomes a source of noise because the high finesse makes it very sensitive to acoustic perturbations. Moreover, if $\bar{F}$ is too large, there is additional selectivity added to the laser system as a whole, which may be undesired. (The frequency selectivity is proportional to $\bar{F}/FSR$.) The invention is supposed to control the intensity, but not to affect the frequency of the laser light. We conclude that a reasonable choice for the finesse is the order of $\bar{F} \approx 1$.

Now we have to decide how to choose the free spectral range. It turns out that there are two possible choices. One of these is to match the free spectral range of the additional cavity to that of the laser resonator. This assures that all modes oscillating in the laser are affected in the same way. This may be desirable in lasers that are intended to produce very many modes, like modelocked lasers for the production of extremely short optical pulses. (It is even possible to make the free spectral range of the additional cavity an integer fraction of the laser cavity; this still matches all possible laser modes with one of the modes of the additional resonator.)

But there is also a very different design approach by reducing the cavity length, that is, increase the free spectral range. It is possible to go to the extreme case of making the mirror spacing just a small fraction of a millimeter and the free spectral range therefore hundreds or thousands of GHz. There is no problem in doing so in the case of single mode lasers where one does not have to control many different modes at the same time. But even in multimode lasers can this be done if the condition $$\frac{FSR}{\bar{F}} \gg \delta v \tag{9}$$

is fulfilled, with $\delta V$ the width of the frequency interval over which lasing modes are desired. For sufficiently short resonators, this condition can always be fulfilled, if the desired laser pulses are more than just a few optical cycles long. On the other hand, this short cavity approach may be very advantageous, for two reasons: The more compact design of a cavity formed by two mirrors very close together makes for a very rugged design, highly unaffected by vibrations. Moreover, the selectivity of a very short cavity is lower, so that the chance of frequency-pulling is reduced. This comes in handy as many applications of single mode lasers require both a stable intensity and a stable frequency at the same time.

Figure 5:
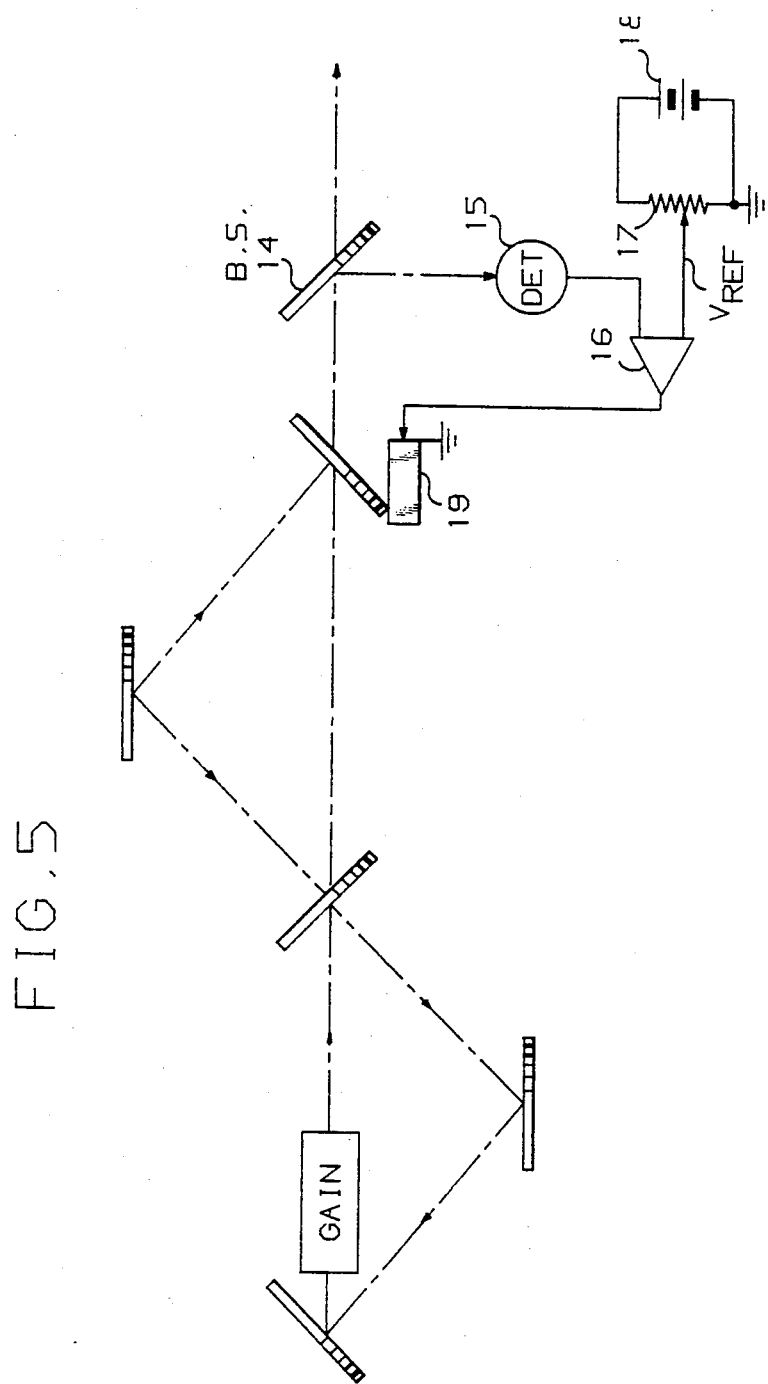
FIGS. 5, 6, and 7 are additional embodiments of the present invention.
Figure 6:
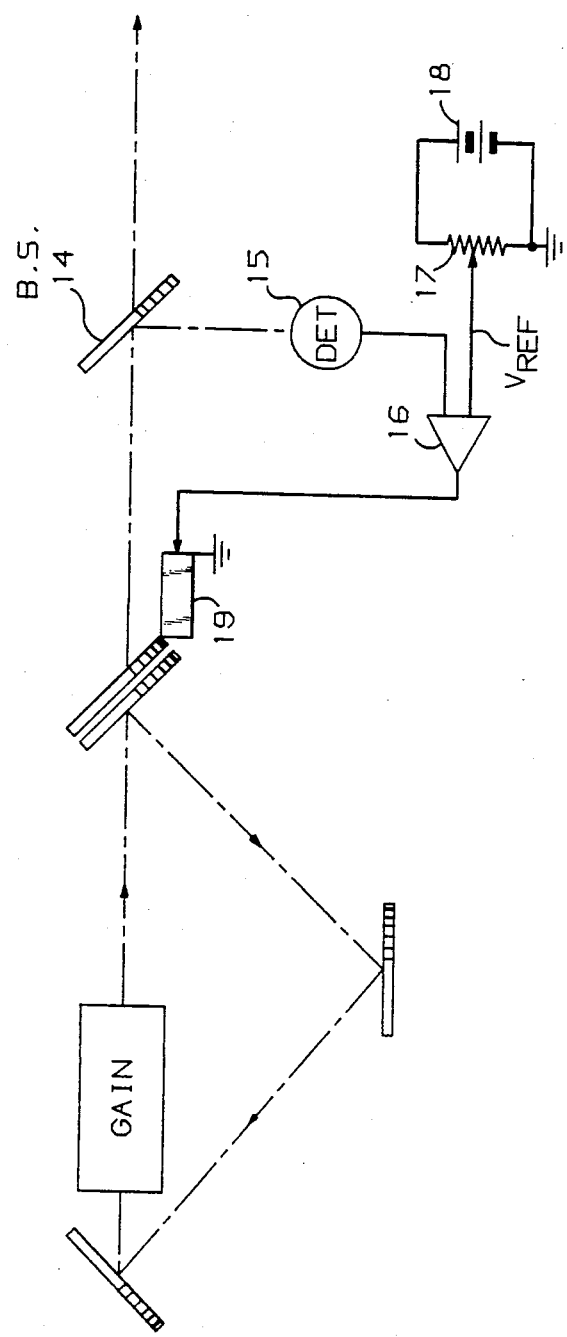

We have so far assumed the laser to have a standing wave cavity, but at this point it seems appropriate to comment on the case of running wave cavities, or ring resonators. On first sight, it seems necessary to add a similar ring resonator to the output rather than just a Fabry-Perot resonator as shown in FIG. 5. But this is only true in those few cases where one has to match the free spectral ranges of both the laser and the additional cavity. In all other cases, one can still choose a linear resonator for the additional cavity if it is only made sufficiently short as shown in FIG. 6. The difference to the standing wave laser case with short additional cavity is then only that here the light enters the cavity at an angle. This introduces additional walk-off losses and therefore reduces the finesse. However, we determined earlier that only a very small finesse of the order of unity is required anyway. Therefore, this modification is completely uncritical.

The third and last question to be answered relates to the technical means of tuning the additional cavity. In order to make it possible to tune to both a maximum and a minimum in equation (2), the optical path length d has to be variable over at least λ/2. There are several possible ways of achieving this, all of which are standard techniques and do not require a detailed description here. Either the geometrical length or the index can be controlled. The most widespread method to accomplish the first is to mount one of the mirrors on a piezo-electric translator such as the one designated as 19 in FIGS. 1, 5 and 6. The second approach is exemplified by the use of an intracavity electro-optic modulator. Other possible techniques (like pressure scanning, etc.) will have to be judged by their speed of response, because this determines the bandwidth of noise that can be canceled and is therefore important for the overall performance. It is highly desirable, for a good reduction of noise, to have a bandwidth of at least several kHz.

SPECIFIC EMBODIMENTS

To illustrate the principles of the present invention, we will now discuss two embodiments for an application of the invention. We first consider a mode-locked dye laser as the laser in FIG. 1, assumed to produce pulses of a duration of 10 ps. This laser has a standing wave cavity, and the output mirror 12 has 90% reflectivity. The envelope of the stream of pulses fluctuates by about 25% peak-peak, mostly at frequencies below 1 kHz. This is too noisy for the intended application.

First we decide whether to use the long or the very short version of the Fabry-Perot resonator. The bandwidth of 10 ps wide pulses is about 30 GHz. From equation (9) we see that this bandwidth can easily be accommodated by an air-spaced Fabry-Perot resonator with, for example, $d \leq 0.25$ mm (this yields a free spectral range FSR $\geq$ 600 GHz) as long as the resonator's finesse is much smaller than $\bar{F}=20$. A possible choice for the additional mirror 75 could be one with a reflectivity of 10% ($r_r^2=0.1$). With this value, equation (5) yields the finesse of the created cavity to be about $\bar{F}=2.5$. The contrast of a resonator of this finesse is about 2.7/1 or 63%, which is more than sufficient for the noise amplitude in the system. One can see that the short cavity version seems suitable.

We still have to decide the technical means by which the optical pathlength d shall be controlled. The noise is predominantly of low frequency, so that we can simply use a piezoceramic translator 19 to control the mirror separation. The error signal at the output of difference amplifier 16 can be obtained by measuring a sample of the intensity transmitted through this additional cavity with a photo detector 15 and subtracting the detector output from a constant reference voltage VREF. The result is the desired error signal which can now be fed to a piezoceramic transducer.

As a second specific embodiment, we describe the stabilization of the soliton laser. See the article entitled "The Soliton Laser", by L. F. Mollenauer and R. H. Stolen, *Optics Letters*, Vol. 9, pp. 13–15, January, 1984, which is incorporated herein by reference. The soliton laser makes use of both the group velocity dispersion and the nonlinear refractive index in a piece of optical fiber in order to produce subpicosecond light pulses. The application of the present invention to this laser leads to a very stable operation and turns the soliton laser into a useful laboratory tool.

The soliton laser consists of a mode-locked color center laser coupled to a second cavity that contains the fiber. It is the interaction of the laser cavity, or main cavity with this fiber cavity, or control cavity, that gives rise to the formation of the short pulses. The present invention can be applied such that the control cavity is at the same time employed for the stabilization of the intensity. It is just this combination that gives another big advantage. The intensity transmitted through the control cavity is in direct proportion to the intensity inside it (the proportionality factor is the output mirror transmission). But this implies that the intensity at the fiber is held constant, too. This is very important, because the soliton laser makes use of the nonlinear (i.e. intensity-dependent) refractive index of the fiber. The result is that not only the intensity, but also the pulse shape and width are stabilized.

Strictly speaking, the analysis given above is no longer valid here because the fiber changes the temporal shape of the pulses so that they cannot accurately be represented by simple vectors. From both numerical calculations and experiment it turns out, however, that the results still hold to a good approximation.

Note that in other situations in which a nonlinear optical effect is involved, the present invention can provide a means of operating under conditions of both high and stable intensity by bringing the nonlinearity into a cavity coupled to the laser light source as described above. This may be applicable in a number of experiments in saturation spectroscopy, which are often performed inside a cavity.

Figure 7:
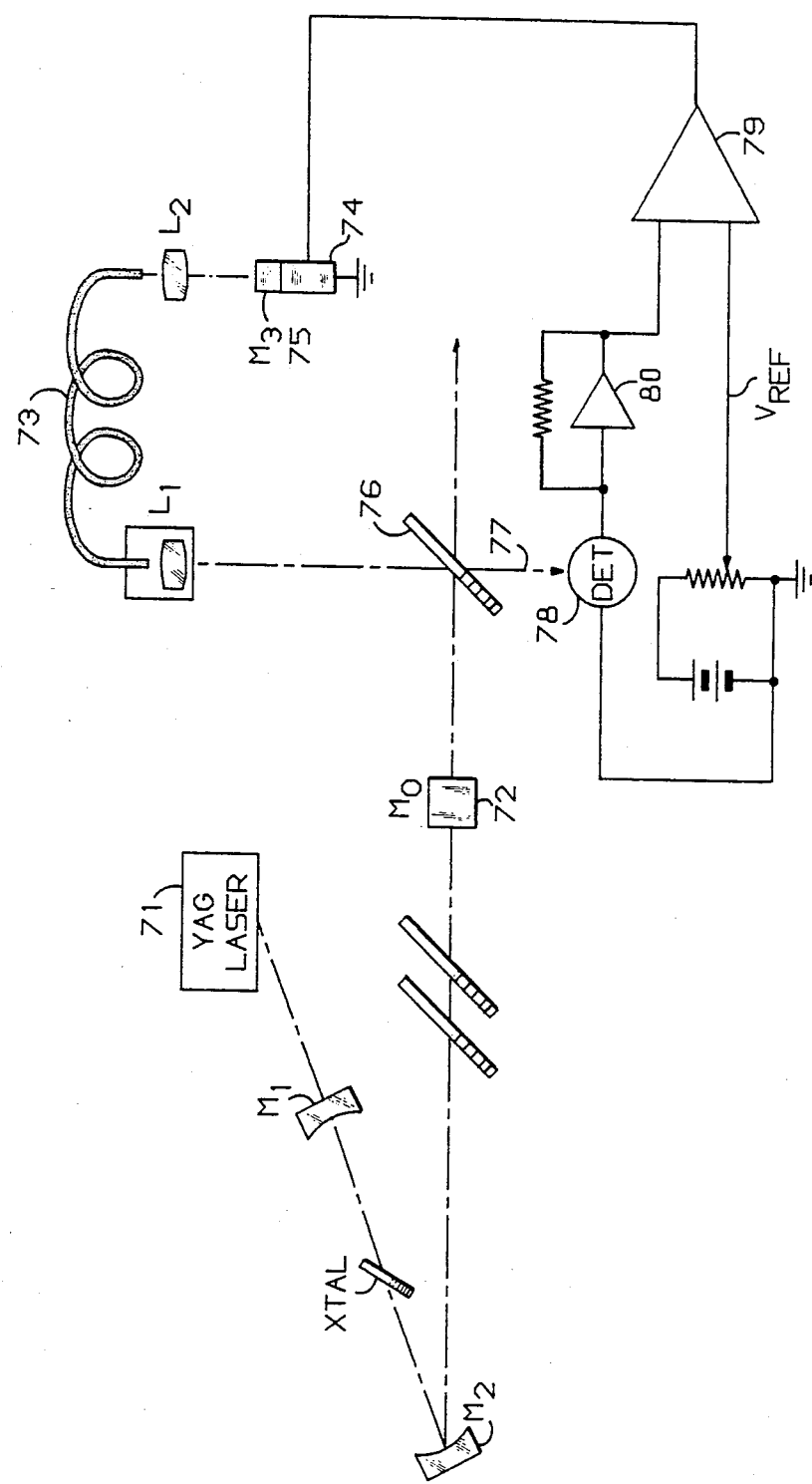

In FIG. 7, a particular realization of the soliton laser is shown having a main (i.e. color center laser) cavity of 1.50 m length, synchronously pumped by an actively mode-locked YAG laser 71. The output mirror 72 ($M_0$) forms, at the same time, one end mirror of the fiber cavity. The dimensions of the fiber cavity are chosen such as to accommodate 1.65 m of fiber 73. This length is dictated by the desired pulse width of, in this case, about 500 femtoseconds. As this length of fiber is equivalent to an optical path length of 2.4 Om in air, the actual cavity path length is chosen to be 3.0 Om, or double that of the main cavity. This length of the fiber cavity is adjusted by a piezoceramic transducer 74 at the other end mirror 75 ($M_3$), which has $R_3=1$. The optical output is taken from a beam splitter 76 inside the fiber cavity. The second beam 77 emerging from beam splitter 76 is sampled by a photodetector 78. From this detector signal, the error signal for the piezoceramic transducer is derived in the same way as described above, that is by subtracting in difference amplifier 79 a constant reference level $V_{ref}$ which represents the desired average intensity. With this arrangement, stable pulses of a length of about 500 fs are produced as a matter of routine. The noise in the pulse peak intensity can be as low as 1% peak-peak.

The invention provides a scheme for the stabilization of the output intensity of lasers. As originally conceived, the invention applies to cw and cw mode-locked lasers. However, it might also be applicable to some pulsed lasers as well. The bandwidth of regulation is not restricted by the laser; rather, it is limited by the speed of the servo system. (In practice, that speed can usually be made high enough to suit the noise bandwidth.) Possible applications are found in all fields where a constant light intensity is important, such as nonlinear optics or optical communications systems.

The limitations in the degree of stabilization will normally be given by the loop gain over the frequency band of interest, which is again restricted by the requirement of stability of the loop. An optimization of feedback loopsa in this respect is a standard engineering task.

Another limitation might conceivably be given by the noise introduced by the electronics in the feedback loop. However, in practice, electronic noise can be made negligible in an optimized design.

There are phase fluctuations produced by the invention as described here which can be undesirable in applications where a quiet optical phase is important, as in heterodyning experiments, for example. In such a case, the invention can still be useful, buy only after a slight modification. Instead of tuning one of the two cavities, both have to be tuned. Both can be controlled by the same error signal, and the relative amount of tuning is determined by the ratio of the two cavity Q factors.

There are other limitations of the performance, however. The technical restrictions can always be reduced by improved design. But finally, there is a limit reached which is given by Heisenberg's uncertainty principle. At that point, the noise in amplitude can still be reduced, but this is inevitably coupled with an increase in phase noise so that the product of amplitude uncertainty and phase uncertainty equals a constant. There is, to present understanding of the laws of nature, no way of avoiding this.

What is claimed is:

1. Apparatus for stabilizing the output intensity of a laser having an output mirror, said apparatus comprising a mirror positioned relative to said output mirror so as to form a Fabry-Perot cavity with said output mirror, means for comparing the intensity of light coupled out of said Fabry-Perot cavity with a reference value so as to develop an error signal, and means coupled to said mirror and responsive to said error signal for adjusting the transmission characteristics of said Fabry-Perot cavity.

2. Apparatus as defined in claim 1 wherein said means for adjusting the transmission characteristics of said Fabry-Perot cavity includes a piezo-electric translator attached to said mirror positioned relative to said output mirror.

3. Apparatus as defined in claim 1 wherein said means for comparing includes a beam splitter positioned in the path of the light coupled out of said Fabry-Perot cavity, a detector for generating an electrical signal whose value corresponds to the intensity of light deflected by said beam splitter, and a difference amplifier for comparing said electrical signal to a reference signal to develop said error signal at its output.

* * * * *